United States Patent
Lynn et al.

[11] Patent Number: 5,985,189
[45] Date of Patent: Nov. 16, 1999

[54] METHOD OF MOLDING USING AN INSULATED WIRING HARNESS FOR A DOMESTIC REFRIGERATOR

[75] Inventors: Shelby A. Lynn, Johnson Township; Edward L. Ryan, III, Center Township; Donald R. Mowerton, Ohio Township; Lori Ann Cook, Scott Township, all of Ind.

[73] Assignee: Whirlpool Corporation, Benton Harbor, Mich.

[21] Appl. No.: 08/125,709

[22] Filed: Sep. 23, 1993

Related U.S. Application Data

[62] Division of application No. 07/914,324, Jul. 17, 1992, Pat. No. 5,248,196.

[51] Int. Cl.⁶ .......................... B29C 44/06; B29C 44/12
[52] U.S. Cl. .................... 264/46.5; 264/275; 264/276
[58] Field of Search ................. 264/276, 46.5, 264/275; 312/406

[56] References Cited

U.S. PATENT DOCUMENTS

| | | | |
|---|---|---|---|
| 3,150,796 | 9/1964 | Hocking et al. | 264/46.5 |
| 3,221,085 | 11/1965 | Rill, Jr. et al. | 264/46.5 |
| 3,265,784 | 8/1966 | Jacobs | 264/46.5 |
| 3,288,896 | 11/1966 | Hendricks | 264/46.5 |
| 3,373,478 | 3/1968 | Simmonds, Jr. | 264/46.5 |
| 3,440,308 | 4/1969 | Carbary et al. | 264/46.5 |
| 3,444,280 | 5/1969 | Pulaski | 264/46.5 |
| 3,446,881 | 5/1969 | Poole | 264/46.5 |
| 3,504,069 | 3/1970 | Borghi | 264/46.5 |
| 3,619,482 | 11/1971 | Boor | 312/406 |
| 3,684,342 | 8/1972 | Jansen | 264/46.5 |
| 3,944,111 | 3/1976 | Nonomaque et al. | 264/46.5 |
| 3,966,283 | 6/1976 | Puterbaugh | 312/406 |
| 4,082,825 | 4/1978 | Puterbaugh | 264/46.5 |
| 4,083,902 | 4/1978 | Clyde | 264/46.5 |
| 4,097,096 | 6/1978 | Kochendorfer | 312/406 |
| 4,180,297 | 12/1979 | Abrams | 312/406 |
| 4,199,205 | 4/1980 | Cooke et al. | 264/46.5 |
| 4,715,512 | 12/1987 | Buchser | 312/406 |
| 4,771,532 | 9/1988 | Taylor, Jr. et al. | 264/46.5 |
| 4,821,399 | 4/1989 | Markley et al. | 264/46.5 |
| 5,248,196 | 9/1993 | Lynn et al. | 264/276 |

FOREIGN PATENT DOCUMENTS

| | | | |
|---|---|---|---|
| 1006732 | 3/1977 | Canada | 264/46.5 |
| 1207370 | 7/1986 | Canada | 312/406 |
| 57-008129 | 1/1982 | Japan | 264/46.5 |

*Primary Examiner*—Allan R. Kuhns
*Attorney, Agent, or Firm*—Hill & Simson

[57] ABSTRACT

A refrigeration apparatus cabinet has an outer shell and an inner liner to define an insulation space therebetween. There is an opening through a wall of the liner and opening into the insulation space. An opening through a wall of the shell opens into the insulation space. A wiring harness is provided in the insulation space. The wiring harness comprises a pair of electrical plug-in connectors and a plurality of conductors extending therebetween, one connector being received in the liner wall opening and the other connector being received in the shell wall opening. Foamed-in-place insulation is provided in the insulation space, the connectors sealing the liner wall opening and the shell wall opening to prevent leakage of the foamed-in-place insulation.

8 Claims, 3 Drawing Sheets

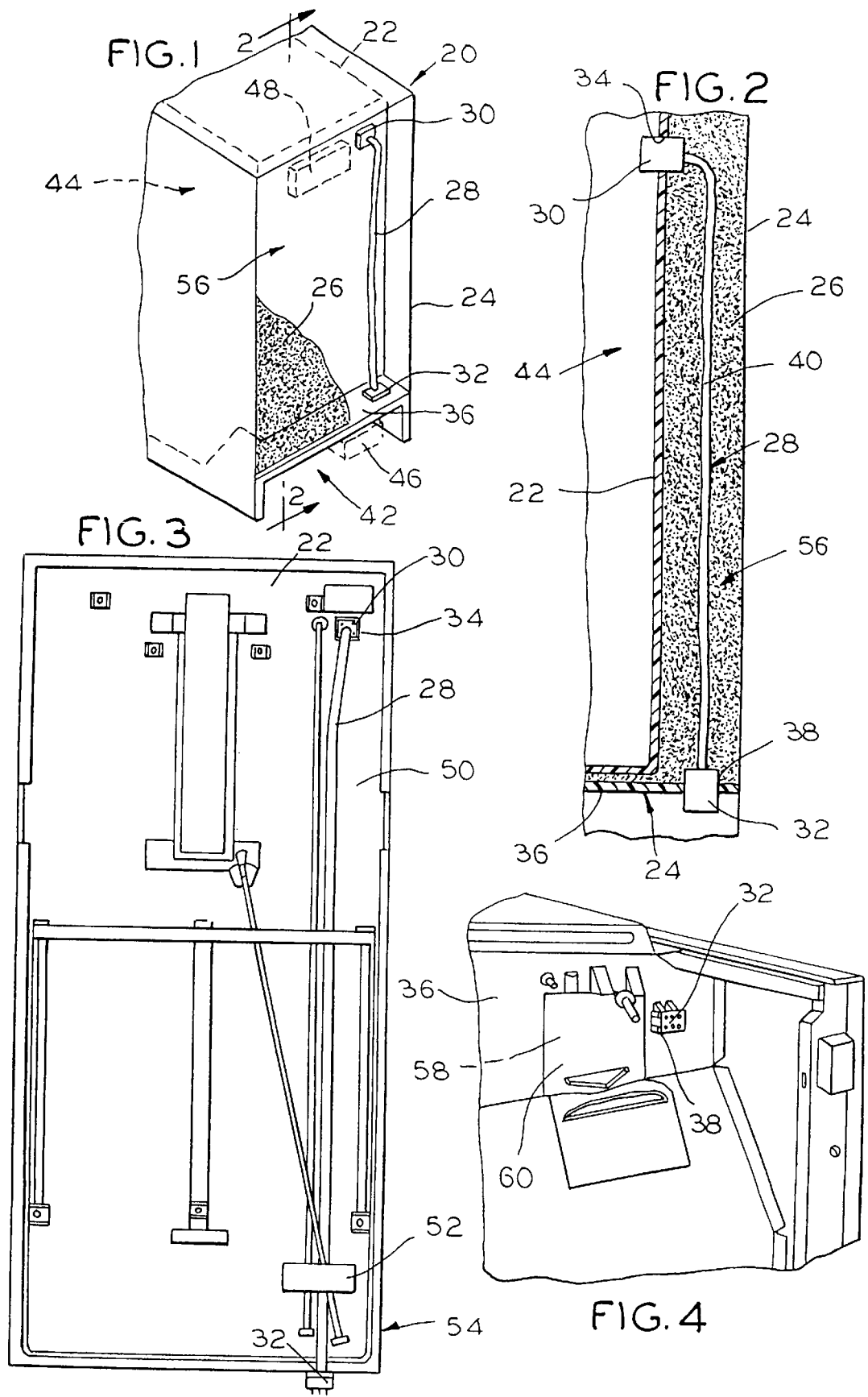

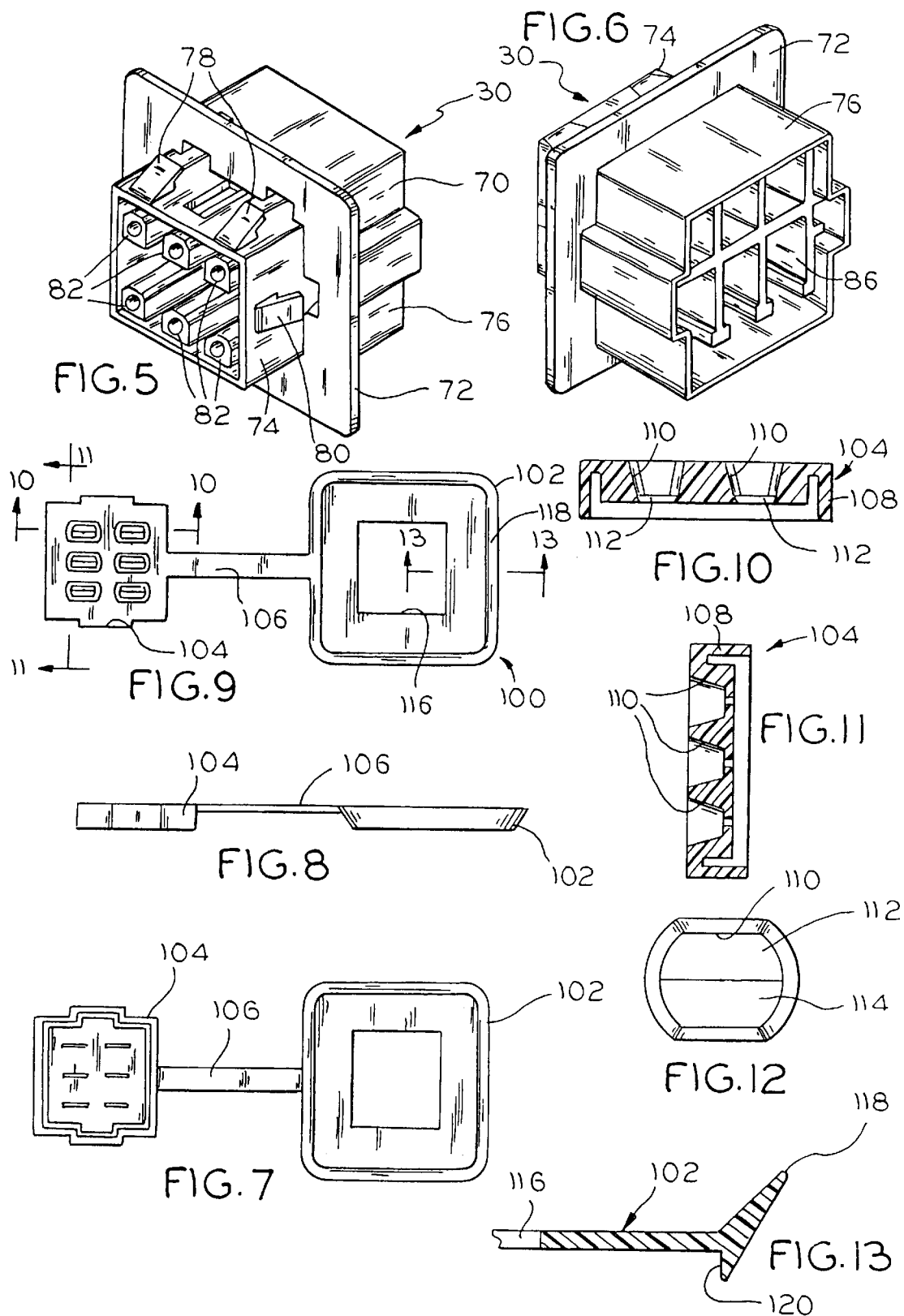

METHOD OF MOLDING USING AN INSULATED WIRING HARNESS FOR A DOMESTIC REFRIGERATOR

This is a division of application Ser. No. 07/914,324, filed Jul. 17, 1992 now U.S. Pat. No. 5,248,196.

FIELD OF THE INVENTION

This invention relates to refrigeration apparatus cabinet construction and, more particularly, to an insulated wiring harness for connecting electrical components therein.

BACKGROUND OF THE INVENTION

In one conventional method of forming a refrigeration apparatus cabinet, a liner is spaced from a shell and foamed-in-place insulation is formed therebetween. To provide electrical power to electrical apparatus within the refrigeration cabinet, a wiring tunnel is provided between the shell and the liner. The conductors are externally mounted at a rear wall of the shell and pass through the tunnel into the cabinet. The external installation of the conductors is used for merits of serviceability. Exposing the conductors can, however, lead to damage of the same.

In some instances, it is desirable to provide the conductors in the space between the shell and the liner embedded in the foamed-in-place insulation. While such routing of the conductors is relatively straightforward, problems result when it is desired to provide proper and effective termination of the conductors. Particularly, the conductors normally connect electrical components which are not disposed within the body of insulation. Therefore, the conductors must exit the insulation space through suitable openings. A problem arises in the provision of such cabinet structures in that the expanding foam insulation tends to escape through any opening in the shell or liner. To prevent such escape, foam stops are normally provided for stopping the foaming action at the opening. However, the use of such foam stops prevents proper withdrawal of the conductors from the space.

The present invention is directed to solving one or more of the problems discussed above in a novel and simple manner.

SUMMARY OF THE INVENTION

In accordance with the invention, there is disclosed a wiring harness disposed in a cabinet insulation space and provided with connectors sealing openings in the liner and shell.

Broadly, there is disclosed herein a method of assembling a refrigeration apparatus cabinet comprising the steps of providing a refrigeration liner defining a storage space, the liner including a liner opening, positioning a cabinet shell having a shell opening surrounding the liner to define an insulation space therebetween, installing a wiring harness in the insulation space, the wiring harness comprising a pair of electrical plug-in connectors and a plurality of conductors extending therebetween, the installing step comprising inserting one connector into the liner opening and the other connector into the shell opening, the above steps being carried out in any order, and injecting a foamed-in-place insulation into the insulation space, the connectors sealing the liner opening and the shell opening to prevent leakage of the foamed-in-place insulation.

It is a feature of the invention that the installing step comprises the step of installing a seal between the one connector and the liner surrounding the liner opening to further seal the same.

It is another feature of the invention that the installing step comprises the step of installing a seal between the other connector and the shell surrounding the shell opening to further seal the same.

It is a further feature of the invention that the installing step comprises the step of installing a seal between each connector and the electrical conductors.

There is disclosed in accordance with another aspect of the invention a refrigeration apparatus cabinet having an outer shell and an inner liner to define an insulation space therebetween. An improvement therein comprises an opening through a wall of the liner and opening into the insulation space. An opening through a wall of the shell opens into the insulation space. A wiring harness is provided in the insulation space. The wiring harness comprises a pair of electrical plug-in connectors and a plurality of conductors extending therebetween, one connector being received in the liner wall opening and the other connector being received in the shell wall opening. Foamed-in-place insulation is provided in the insulation space, the connectors sealing the liner wall opening and the shell wall opening to prevent leakage of the foamed-in-place insulation.

In accordance with the invention there is also provided a foam seal for each connector, each foam seal comprising a gasket surrounding the connector and disposed between a peripheral flange on the connector and the wall to which the connector is mounted.

It is a feature of the invention that the foam seal comprises an elastomeric gasket.

It is another feature of the invention that the foam seal comprises a gasket of open cell foam.

It is still another feature of the invention that the foam seal diverges outwardly to provide a suction seal with the wall.

In accordance with the invention there is also provided a rear seal for each connector, each rear seal comprising an elastomeric boot surrounding one end of the connector disposed in the insulation space, the boot including a plurality of slits receiving the conductors connected to the connecter.

It is a feature of the invention that the boot is thinner in cross-section surrounding each slit.

It is still another feature of the invention that the boot and foam seal are integrally formed and are connected by an elongate strap.

More particularly, a flange mounted electrical plug-in connector is mounted to the back side of a plastic refrigerator liner with a plurality of insulated copper wires attached and extending downwardly and attached to another electrical plug-in connector. The other connector is mounted to the bottom deck of the refrigerator cabinet. The connectors provide easy snap-in method of mounting the wiring harness, which is then foamed-in-place. The wiring harness transports power from the unit compartment at the bottom of the refrigerator cabinet to the control box area at the top of the refrigerator within the refrigerator space with no exposed wiring on the back of the cabinet.

To prevent foamed-in-place insulation from leaking, a foam seal is provided for each connector. The foam seal seals the back of the connector from foam leaks, seals the front of the connector from foam leaks, stabilizes terminals inside the connector housing for alignment, provides strain relief to prevent terminal breakage and allows all combinations of circuit usage with one single design.

Further features and advantages of the invention will be readily apparent from the specification and from the drawing.

BRIEF DESCRIPTION OF THE DRAWING

FIG. 1 is a partial, perspective view of a refrigeration apparatus cabinet manufactured according to the invention;

FIG. 2 is a cross-section taken along the line 2—2 of FIG. 1;

FIG. 3 is a rear elevation view of a liner assembly for the cabinet of FIG. 1;

FIG. 4 is a bottom, partial plan view of the cabinet of FIG. 1;

FIG. 5 is a front perspective view of an electrical connector for the wiring harness of FIG. 3;

FIG. 6 is a rear perspective view of the connector of FIG. 5;

FIG. 7 is a plan view of a seal for the connector of FIG. 5;

FIG. 8 is a side view of the seal of FIG. 7;

FIG. 9 is a opposite elevation view of the seal of FIG. 7;

FIG. 10 is a sectional view taken along the line 10—10 of FIG. 9;

FIG. 11 is a sectional view taken along the line 11—11 of FIG. 9;

FIG. 12 is a detail view of a portion of the seal of FIG. 9;

FIG. 13 is a sectional view taken along the line 13—13 of FIG. 9;

DETAILED DESCRIPTION OF THE INVENTION

Figure 14:
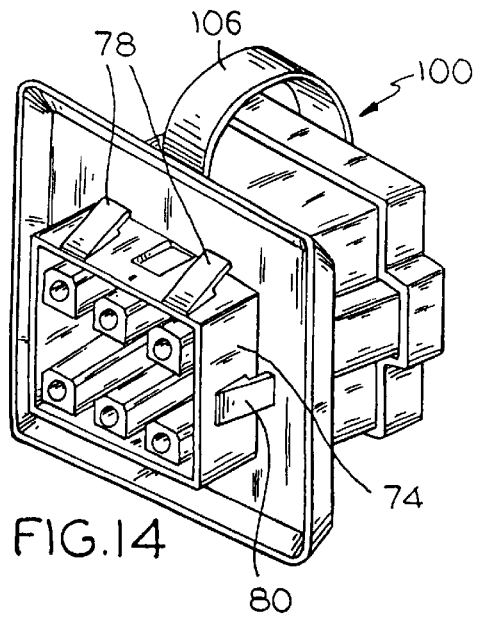
FIG. 14 is a front perspective view of the connector of FIG. 5 with the seal of FIG. 9 installed thereon.

In the illustrated embodiment of the invention, as disclosed in the drawing, a cabinet 20 comprises an insulated wall structure defined by a first, inner wall member 22, a second, outer wall member 24 and a body of foamed-in-place insulation 26 therebetween. In the illustrated embodiment, the cabinet 20 comprises a refrigeration apparatus cabinet wherein the inner wall member 24 comprises a liner and the outer wall member 24 comprises a shell.

The present invention is concerned with the provision of means extending through the cabinet construction and, more specifically, the provision of extending electrical conductors therethrough, as shown in FIGS. 1 and 2, disposed within the body of foamed-in-place insulation 26.

More particularly, the wiring harness 28 includes first and second plug-in connectors 30 and 32. The first connector 30 is mounted to the back side of the liner 22 and is received in an opening 34 therein. The second connector 32 is mounted to a bottom deck wall 36 of the shell 24 and is received in an opening 38 therein. A plurality of insulated conductors 40 are terminated at and extend between the connectors 30 and 32 in any known manner, as necessary for the particular cabinet 20. Advantageously, the conductors 40 may be surrounded by a flexible insulation sleeve.

In the illustrated embodiment of the invention, the wiring harness 28 is used to transport electrical power from a unit compartment 42 at the bottom of the cabinet 20 to a control box area within the cabinet storage space 44. More particularly, the wiring harness 28 may connect refrigeration components, illustrated schematically at 46, in the unit compartment 42 to control components, illustrated schematically at 48, in the storage space 44.

In the illustrated method of assembling the cabinet 20, the liner 22 is provided as illustrated in FIG. 3 having a liner opening 34 therein. The wiring harness 28 is positioned along a back wall 50 of the liner with the connector 30 being snap fit into the opening 34. The wiring harness 28 extends downwardly along the back wall 50 along with other suitable components and a piece of adhesive tape 52 is used for maintaining alignment of these components relative to a bottom portion 54 of the liner. The cabinet shell is then positioned surrounding the liner 24 to define an insulation space 56 therebetween, see FIGS. 1 and 2. The second connector can be grasped through an enlarged opening 58 in the shell deck wall 36 and snap fit into the deck wall opening 38, see FIG. 4. A section of foil 60 is then adhered over the opening 58 to seal the same. The foamed-in-place insulation 26 is then injected into the space 56. The connectors 30 and 32 generally seal the liner opening 34 and shell opening 38 to prevent leakage of the foamed-in-place insulation while it is expanding and subsequently curing.

To further prevent leakage, the connectors are provided with sealing means, discussed below, for providing an improved seal between the connectors 30 and 32 at the place of mounting.

With reference to FIGS. 5 and 6, the plug-in connector 30 is illustrated in greater detail. Although not specifically illustrated, the other connector 32 is identical in construction.

The connector 30 comprises a molded block housing 70. A peripheral flange 72 separates the block 70 into a front housing 74 and rear housing 76. The flange 72 provides a stabilizing surface to insure proper connector alignment when mounting to the plastic liner 22 or metal deck 36. The size of the flange 72 provides sufficient surface area for receiving and containing a gasket, discussed below, sandwiched between the connector 30 and the liner 22 or deck 36 to insure against foam insulation leakage into the interior freezer compartment 44 or into the unit compartment 42.

Figure 15:
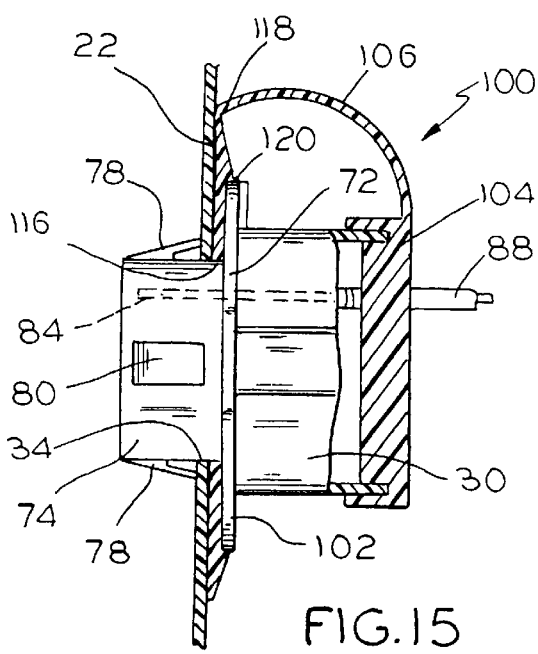
FIG. 15 is a side, partial sectional view illustrating the connector and seal assembly of FIG. 14 mounted through a wall opening.

Three molded tabs 78, see also FIG. 15, on the outside of the front housing 74, provide containment of the connector 30 to the plastic liner 22. Two additional molded tabs 80, one of which is shown, provide containment of the connector 32 to the metal deck 36. Particularly, the tabs 80 are more closely spaced to the flange 72 since the wall of the deck 36 is thinner than the wall of the liner 22.

The front housing 74 houses six silos 82 for containing metal electrical terminal pins, one of which is illustrated in phantom in FIG. 15. Each silo 82 opens into a compartment 86, see FIG. 6, in the rear housing 76 through which electrical conductors 88, see FIG. 15, with pins 84 thereon are inserted.

Although not shown, an additional electrical connector, mateable with the connector 30, is provided for connection to the control components 48, in the case of the first connector 30, and the refrigeration components 46, in the case of the second connector 32.

With reference to FIGS. 7–13, a foam seal 100 for the connector 30 of FIG. 5 is illustrated. The foam seal 100 is a one-piece elastomeric unit which has a front seal portion 102 connected to a rear seal portion 104 by an intermediate strap 106.

The rear seal portion 104 is placed over the rear connector housing 76 prior to insertion of the terminated conductors 88. The rear seal portion 104 includes a tightly fitting lip 108 surrounding the rear housing 76. The lip 108 prevents foam permeation into the compartments 86. The rear seal 104 includes a plurality of counterimpressions 110, one for each channel 86, for a total of six. A thin skin 112 extends across the bottom and is provided with a slit 114. The thin skin 112 and slot 114 stop leaks in both used and unused areas while allowing use of a common connector 30 for all applications. The shape of the counterimpression 110 and its skin 112 also provide terminal lead in and strain relief. Particularly, each terminated conductor 88 is inserted through the slot 114 into the associated compartment 86, and thus silo 82, in manufacturing the wiring harness 28.

The front seal 102 is generally rectangular and includes a central aperture 116 for receiving the connector front housing 74. The front seal 102 is held in place by the tabs 78 and 80, see FIG. 14. A peripheral flange 118 diverges outwardly, see FIG. 13, to provide a suction seal with the liner wall 22 or deck wall 36. An opposite side lip 120, see FIG. 13, seals around the connector flange 72 and provides a stop to a leak path between the front seal 102 and the flange 72.

The intermediate strap 106 provides a convenient means for maintaining the front seal 102 and rear seal 106 together during processing and installation and provides economies in manufacturing.

Thus, when the connector 30 is mounted to the liner wall 22 at the opening 34, the front seal acts as a gasket with the angled peripheral flange 118 providing a suction seal between the flange 72 and the liner wall 22. The rear lip 120 provides a seal surrounding the connector flange 72. The front peripheral flange 118 also forces the lip 120 against the connector flange 72 to further prevent foam from escaping. The rear seal 104 seals the back of the connector 30 from foam leaks while also stabilizing the terminals for alignment and providing stress relief. Moreover, the seal 100 provides all combinations of circuit usage with one single design.

Figure 16:
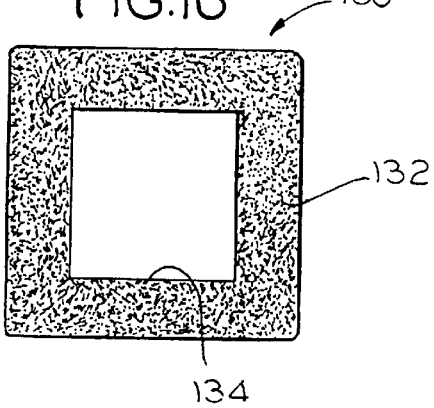
FIG. 16 is a front view of a seal according to an alternative embodiment of the invention.
Figure 17:
FIG. 17 is a side view of the seal of FIG. 16.

In the above embodiment of the invention, the front seal is of a thickness to accommodate a wall thickness ranging from 0.009 inches to 0.105 inches. In extreme material thickness conditions, a front seal 130, see FIGS. 16 and 17, according to an alternative embodiment is used.

Figure 18:
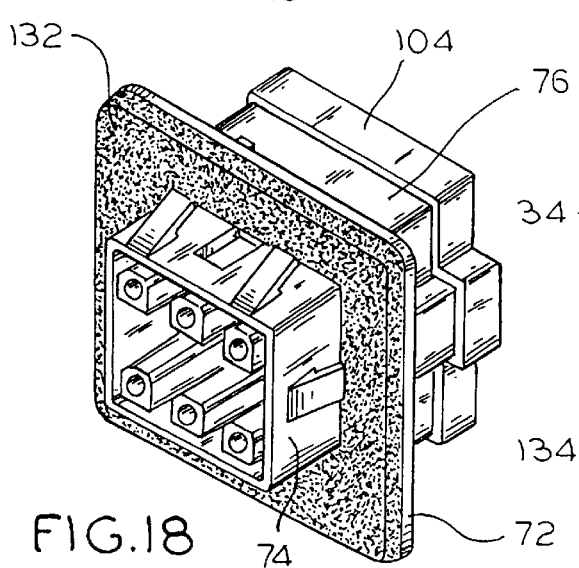
FIG. 18 is a front perspective view illustrating the seal of FIG. 16 mounted on the connector of FIG. 5.
Figure 19:
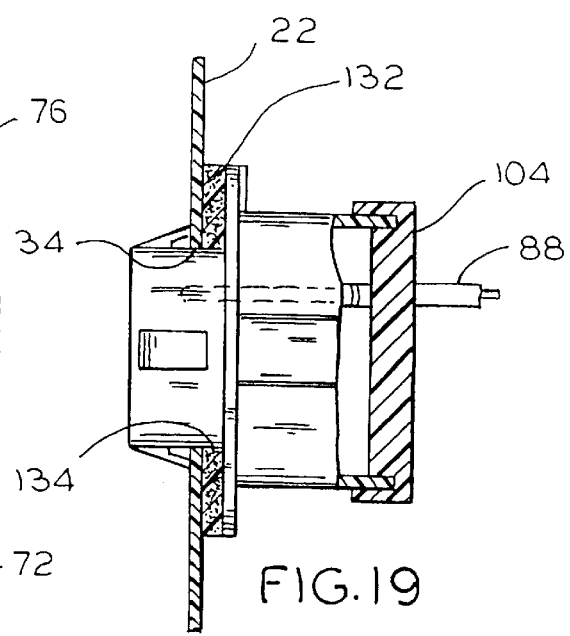
FIG. 19 is a side view of the connector and seal assembly of FIG. 18 mounted to a wall opening.

The front seal or gasket 130 comprises a rectangle 132 of open cell foam including an aperture 134 for receiving the connector front housing 74. Particularly, the front seal 130 is placed in abutting relation with the connector flange 72, as shown in FIG. 18. The rear seal 104, not connected to a strap 106 or front seal 102 such as above, is used on the connector rear housing 76. The connector and seal are then inserted into the opening 34 of the liner wall 22 whereby the gasket 132 seals the front of the connector 30 from foam leaks, see FIG. 19.

Thus, in accordance with the invention, there is illustrated a wiring harness installed in the insulation space between a liner and cabinet shell metal deck prior to injecting foamed-in-place insulation therein. The liner and metal deck openings are sealed using suitable front and rear seals on the connector to prevent foam leakage.

We claim:

1. A method of assembling a storage cabinet, comprising the steps of:

providing an inner wall defining a storage space, the inner wall including a first opening;

positioning an outer wall having a second opening surrounding said inner wall to define an insulation space therebetween;

installing a wiring harness in said insulation space, the wiring harness comprising a pair of electrical plug-in connectors and a plurality of conductors extending therebetween, the installing step comprising inserting one connector into the first opening and the other connector into the second opening, the above steps being carried out in any order; and injecting a foamed-in-place insulation into said insulation space, said connectors sealing said first opening and said second opening to prevent leakage of the foamed-in-place insulation.

2. The method of claim 1 wherein said installing step comprises the step of installing a seal between the one connector and the inner wall surrounding the first opening to further seal the same.

3. The method of claim 1 wherein said installing step comprises the step of installing a seal between the other connector and the outer wall surrounding the second opening to further seal the same.

4. The method of claim 1 wherein said installing step comprises the step of installing a seal between each connector and the electrical conductors.

5. A method of assembling a refrigeration apparatus cabinet including a liner defining a storage space for housing first electrical components and a cabinet shell for housing second electrical components, comprising the steps of:

providing the liner, the liner including a liner opening;

positioning the cabinet shell surrounding said liner to define a space therebetween, the shell including a shell opening;

installing a wiring harness in said space, the wiring harness comprising a pair of electrical plug-in connectors and a plurality of conductors extending therebetween, the installing step comprising inserting one connector into the liner opening and the other connector into the shell opening, the above steps being carried out in any order; and injecting a foamed-in-place insulation into said space, said connectors sealing said liner opening and said shell opening to prevent leakage of the foamed in place insulation.

6. The method of claim 5 wherein said installing step comprises the step of installing a seal between the one connector and the liner surrounding the liner opening to further seal the same.

7. The method of claim 5 wherein said installing step comprises the step of installing a seal between the other connector and the shell surrounding the shell opening to further seal the same.

8. The method of claim 5 wherein said installing step comprises the step of installing a seal between each connector and the electrical conductors.

* * * * *